(12) United States Patent
Hattori (10) Patent No.: US 6,460,831 B2
(45) Date of Patent: Oct. 8, 2002

(54) CUTTING LIQUID COATER

(75) Inventor: Hiroshi Hattori, Toyama (JP)

(73) Assignee: Fuji BC Engineering Co., Ltd., Nagoya (JP)

( * ) Notice: Subject to any disclaimer, the term of this patent is extended or adjusted under 35 U.S.C. 154(b) by 0 days.

(21) Appl. No.: 09/761,527

(22) Filed: Jan. 16, 2001

(65) Prior Publication Data

US 2002/0007706 A1 Jan. 24, 2002

Related U.S. Application Data

(62) Division of application No. 09/202,125, filed as application No. PCT/JP97/04165 on Nov. 14, 1997, now Pat. No. 6,199,465.

(30) Foreign Application Priority Data

Nov. 29, 1996 (JP) .............................................. 8-319449
Jun. 9, 1997 (JP) .............................................. 9-151081
Sep. 2, 1997 (JP) .............................................. 9-237369

(51) Int. Cl.[7] ................................................ B01F 3/04
(52) U.S. Cl. ..................... 261/36.1; 261/64.1; 261/78.2
(58) Field of Search ....................... 261/36.1, 37, 64.1, 261/76, 78.2, DIG. 39

(56) References Cited

U.S. PATENT DOCUMENTS

| | | | |
|---|---|---|---|
| 954,451 A | * | 4/1910 | Merrell ........................ 261/76 |
| 992,503 A | | 5/1911 | Howard |
| 1,333,451 A | | 3/1920 | Sample |
| 2,020,325 A | * | 11/1935 | Myhren et al. ............. 261/78.2 |
| 2,245,601 A | | 6/1941 | Medsker |
| 2,438,868 A | | 3/1948 | Trier |
| 2,613,067 A | | 10/1952 | Goodyer et al. |
| 2,719,604 A | | 10/1955 | Allen |
| 2,981,526 A | | 4/1961 | Grumbach |
| 3,240,243 A | | 3/1966 | Golick |
| 3,249,553 A | * | 5/1966 | Steinberg .................... 261/78.2 |

(List continued on next page.)

FOREIGN PATENT DOCUMENTS

| | | |
|---|---|---|
| DE | 195 19 885 | 12/1996 |
| EP | 0 458 632 | 11/1991 |
| EP | 0 539 055 | 10/1992 |
| EP | 0 941 769 | 9/1999 |

(List continued on next page.)

OTHER PUBLICATIONS

Supplementary European Search Report, EP 97 91 2472.4, Sep. 19, 2001.
European Search Report, EP 99 95 3308, Jul. 12, 2001.
European Search Report, EP 97 91 2472, Jul. 12, 2001.

Primary Examiner—C. Scott Bushey
(74) Attorney, Agent, or Firm—Merchant & Gould P.C.

(57) ABSTRACT

A liquid coater which includes a mist feed tube (5) for feeding oil mist into an airtight container (2), an air hose (10) for feeding air into the airtight container (2) and a mist conveyor pipe (11) for conveying the oil mist pressurized by air inside the airtight container (2) to the outside of the container. Therefore, droplets and large mist particles can be trapped inside the container from the mist feed tube (5), and the mist can be conveyed at a high speed. The liquid coater has excellent applicability. The mist feed tube (5) has a double tube structure comprising an air tube (7) in which air flows, and an oil tube (6) which extends in the air tube (7) and in which the oil flows. The distal end of the oil tube (6) is positioned more inward than the distal end of the air tube (7), so that the oil mist can be fed by a simple construction.

10 Claims, 8 Drawing Sheets

U.S. PATENT DOCUMENTS

| | | | |
|---|---|---|---|
| 3,491,855 A | | 1/1970 | Obergefell et al. |
| 3,618,709 A | | 11/1971 | Boelkins |
| 3,744,771 A | * | 7/1973 | Deaton ................. 261/78.2 |
| 3,756,348 A | | 9/1973 | Izumi |
| 3,939,944 A | | 2/1976 | Mitchell |
| 4,131,658 A | * | 12/1978 | Hirata et al. ............. 261/78.2 |
| 4,309,456 A | | 1/1982 | Lock |
| 4,335,804 A | | 6/1982 | Bardin et al. |
| 4,421,798 A | | 12/1983 | Lin |
| 4,541,966 A | * | 9/1985 | Smith ..................... 261/76 |
| 4,637,493 A | | 1/1987 | Ehler |
| 4,802,555 A | | 2/1989 | Matsunaga |
| 5,427,203 A | | 6/1995 | Anspach, Jr. et al. |
| 5,609,798 A | * | 3/1997 | Liu et al. ............... 261/78.2 |
| 5,806,630 A | | 9/1998 | Bernal |

FOREIGN PATENT DOCUMENTS

| | | | |
|---|---|---|---|
| EP | 1 106 902 | 6/2001 | |
| FR | 1 152 856 | 2/1958 | |
| FR | 2 670 138 | 12/1990 | |
| GB | 465357 | * 5/1937 | ............. 261/78.2 |
| JP | 25-3045 | 9/1950 | |
| JP | 53-53124 | 12/1978 | |
| JP | 54-6762 | 3/1979 | |
| JP | 55-2487 | 1/1980 | |
| JP | 62-65147 | 4/1987 | |
| JP | 63-214131 | 9/1988 | |
| JP | 2-122873 | 5/1990 | |
| JP | 5-45393 | 6/1993 | |
| JP | 5-92596 | 12/1993 | |
| JP | 6-58491 | 3/1994 | |
| JP | 6-129594 | 5/1994 | |
| JP | 6-174190 | 6/1994 | |
| JP | 6-193795 | 7/1994 | |
| JP | 7-110100 | 4/1995 | |
| JP | 9-159610 | 6/1997 | |
| JP | 9-248735 | 9/1997 | |
| JP | 5-99398 | 4/1998 | |
| JP | 6-58491 | 3/1999 | |
| WO | WO 93/01891 | 2/1993 | |
| WO | WO00/09937 | 2/2000 | |

* cited by examiner

CUTTING LIQUID COATER

This application is a Divisional of U. S. patent application Ser. No. 09/202,125, filed Feb. 24, 1999, now U.S. Pat. No. 6,199,465, which was the national stage filing of PCT/JP97/04165 filed under 35 U.S.C. 371, the international application being filed on Nov. 14, 1997.

FIELD OF THE INVENTION

The present invention relates to a liquid coater that applies liquid to target objects by delivering mists (liquid minute particles) in a container. Particularly, the present invention relates to a liquid coater that applies a cutting oil to a cutting edge of a machine tool such as a machining center, a grinding machine, or a lathe.

BACKGROUND OF THE INVENTION

Conventionally, oil has been applied to target objects such as workpieces and tools in order to improve machining accuracy and to extend tool life in machining. In a method of applying liquid oil directly toward target objects, an excessive amount of oil has been applied and it has taken time to remove extra oil, thus decreasing productivity. Furthermore, since the extra oil floats up around a coater, a countermeasure for preventing a working environment from getting worse has been necessary.

When applying oil in a drop-state, machining can be conducted with a very small (minimum necessary) amount of oil, thus not only improving machining accuracy and productivity, but also leading to the improvement of a working environment and the simplification of a plant. An example of coaters that can apply oil in a drop-state is proposed in Unexamined Japanese Utility Model Application Jikkai Hei 5-92596.

However, in an oil feeder mentioned above, it has been necessary to provide a casing for an oil dropping part, a passage for a high-speed gas, a Venturi nozzle and the like in a mist generating section. In addition, since an oil tank has been constructed individually, the configuration has been complicated.

SUMMARY OF THE INVENTION

Object of the present invention is to provide a liquid coater excellent in fast-response that can generate fine mists with a simple configuration by simplifying the configuration of a mist generating section and that can convey the mists at a high speed by providing a gas feed passage. The problems mentioned above can be solved by the present invention.

In order to attain the object mentioned above, a first liquid coater of the present invention comprises: a mist feed nozzle for feeding mists into a container; a gas feed passage for feeding gas into the container; and a mist conveying passage for conveying the mists pressurized by the gas inside the container to the outside of the container.

According to the first liquid coater, droplets and large mist particles fed from the mist feed nozzle can be trapped inside the container and therefore only fine mist particles can be conveyed to the outside of the container. The fine mist particles do not adhere on the wall surface of the conveying passage easily. Therefore, it is easy to convey the fine mist particles. In addition, the conveying speed at which the fine mist particles are conveyed can be accelerated by the gas fed from the gas feed passage. Consequently, the mist conveyance is excellent in fast-response and the mists can be conveyed at a high speed.

In the first liquid coater mentioned above, it is preferable that a discharge part with a narrowed tip is connected to the end of the mist conveying passage. When such a discharge part is connected, flow velocity increases at the discharge part, thus enlarging the particle size of the fine mists and changing the fine mists into droplets. Consequently, these large mist particles and droplets can be applied to target objects and therefore it is easy to make liquid adhere to the target objects.

It is preferable that the mist feed nozzle has a double tube structure comprising a gas tube in which gas flows and a liquid tube in which liquid flows that extends inside the gas tube, and the end of the liquid tube is positioned inward compared to the end of the gas tube. According to such a liquid coater as mentioned above, mists can be generated with a simple configuration.

It is preferable that mists are generated at a space between the end of the liquid tube and the end of the gas tube by mixing a liquid discharged from the liquid tube and a gas flowing inside the gas tube.

It is preferable that a gas flow-regulating valve is connected to the gas feed passage. According to such a liquid coater as mentioned above, the mist conveying speed can be regulated.

It is further preferable that liquid for generating mists is collected in the container and flows into a liquid pump connected to the container, and the liquid discharged from the liquid pump goes through the mist feed nozzle and is fed as mists into the container. According to such a liquid coater as mentioned above, the liquid can be circulated efficiently.

It is preferable that an opening part of the end of the mist conveying passage faces to the surface of the collected liquid.

It is also preferable that the distance between the end of the mist conveying passage inside the container and the surface of the collected liquid can be regulated. According to such a liquid coater as mentioned above, the size of mist particles flowing into the mist conveying passage can be regulated.

It is preferable that the liquid pump is integrated with the container at the bottom of the container. According to such a liquid coater as mentioned above, a small-size coater can be obtained.

Furthermore, it is preferable that the end of the mist feed nozzle is arranged so that mists are injected from the mist feed nozzle toward the inner-wall side face of the container. According to such a liquid coater as mentioned above, since the injected mists circulate along the inner-wall side face, a centrifugal force is strongly applied to large mist particles and droplets injected together with the mists. Therefore, the mists and the droplets adhere to the inner-wall side face easily, thus preventing the large mist particles and the droplets from flowing into the mist conveying passage.

It is preferable that the container is formed in a cylindrical shape. According to such a liquid coater as mentioned above, it is easy to circulate mists.

It is preferable that the end of the mist conveying passage inside the container is provided almost at the center in the horizontal direction of the container. Since a mist conveying passage is arranged as mentioned above, fine mist particles gathering at the center can be conveyed.

It is further preferable that a partition in which a flow-through hole is formed is provided in the horizontal direction of the container, the container is divided into an upper part and a lower part by the partition, a liquid reservoir is provided below the partition, and the mist feed nozzle, the gas feed passage, and the mist conveying passage are provided above the partition. According to such a liquid coater as mentioned above, since the liquid surface is not disturbed in the liquid reservoir, mists with a stable mist-particle size can be conveyed.

Moreover, it is preferable that a pipe is provided at a part of the partition in the vertical direction and the pipe enables the gas in the upper part and the lower part to be circulated. According to such a liquid coater as mentioned above, since oil can be dropped promptly at the time of refueling, the coater can be started quickly.

A second liquid coater of the present invention generates mists from liquid in a container and discharges the mists to the outside of the container. The liquid coater comprises: a lower nozzle having a gas injection port in the liquid; an upper nozzle having a gas injection port in the upper part of the container; and a mist conveying passage provided in the upper part of the container, which conveys mists in the container to the outside of the container. Mists are generated by injecting gas from the gas injection port of the lower nozzle.

According to the second liquid coater, mists can be generated with a simple configuration, and an oil-circulating pump is not required. Therefore, the coater itself can be simplified. Since the upper nozzle is provided, large mist particles and droplets are prevented from rising in the container and disturbances at the liquid surface can be reduced. Consequently, large mist particles and droplets can be prevented from flowing into the mist conveying passage. Furthermore, by injecting gas from the upper nozzle, the mist conveying speed can be increased more than that limited by the lower nozzle, thus regulating the mist conveying speed in a wide range.

In the second liquid coater mentioned above, it is preferable that a discharge part with a narrowed tip is connected to the end of the mist conveying passage. When such a discharge part is connected, flow velocity increases at the discharge part, thus enlarging the particle size of fine mists and changing the fine mists into droplets. Consequently, these large mist particles and droplets can be applied to target objects and therefore it is easy to make liquid adhere to the target objects.

It is preferable that the gas injection port of the upper nozzle and the gas injection port of the lower nozzle are arranged so that gas is injected toward the inner-wall side face of the container from both the gas injection ports. According to such a liquid coater as mentioned above, since generated mists circulate along the inner-wall side face, a centrifugal force is strongly applied to large mist particles and droplets injected together with the mists. Therefore, the mists and the droplets adhere to the inner-wall side face easily, thus preventing the large mist particles and the droplets from flowing into the mist conveying passage.

It is preferable that the container is formed in a cylindrical shape. According to such a liquid coater as mentioned above, it is easy to circulate mists.

It is also preferable that the directions of the gas injection port of the upper nozzle and of the gas injection port of the lower nozzle are arranged so that circulating directions of the gas injected from the gas injection port of the upper nozzle and of the gas injected from the gas injection port of the lower nozzle are opposite to each other. According to such a liquid coater as mentioned above, since the circulating directions are opposite to each other, the circulation caused by the gas injected from the lower nozzle is partially canceled by the gas injected from the upper nozzle, or the circulation power is decreased. Therefore, large mist particles and droplets distributed in the vicinity of the inner-wall side face can be prevented from rising within the container, and disturbance at the liquid surface can be reduced, thus reducing large mist particles and droplets flowing into the mist conveying passage.

It is further preferable that a reticulated filter is provided in the horizontal direction inside the container and the container is divided into an upper part and a lower part by the filter. According to such a liquid coater as mentioned above, the filter is provided, thus reducing large mist particles and droplets generated by the gas injected from the lower nozzle flowing into the mist conveying passage.

It is preferable that a gas flow-regulating valve is connected to at least one of the upper and lower nozzles. According to such a liquid coater as mentioned above, an amount of mists, a size of mist particles, and a mist conveying speed can be regulated.

It is also preferable that the end of the mist conveying passage inside the container is provided almost at the center in the horizontal direction of the container. Since a mist conveying passage is arranged as mentioned above, fine mist particles gathering at the center can be conveyed.

BRIEF DESCRIPTION OF THE DRAWINGS

FIG. 1 is a schematic view showing an oil feeding system in a liquid coater according to Examples 1 and 2 of the present invention.

FIG. 2 is a view showing an arrangement of a tube for oil mists in FIG. 1 and an oil pump.

FIG. 3 is a cross-sectional view of a primary portion of a liquid coater according to Example 1 of the present invention.

FIG. 4 is a view showing another example of a tube for oil mists.

FIG. 5 is a cross-sectional view of a primary portion of a liquid coater according to Example 2 of the present invention.

FIG. 6 is a perspective view of a liquid coater according to Example 3 of the present invention.

FIG. 7 is a cross-sectional view in the vertical direction of the liquid coater according to Example 3 of the present invention.

FIG. 8A is a cross-sectional view taken on line I—I in FIG. 7 and FIG. 8B is a cross-sectional view taken on line II—II in FIG. 7.

BEST MODE FOR CARRYING OUT THE INVENTION

Examples of the present invention will be explained as follows.

Example 1

In this example, a liquid coater according to the present invention is used as an oil feeder for a machine tool. FIG. 1 shows a schematic oil feeding system in which oil fed from an oil pump is supplied to a machine tool via the oil feeder. An arrow a, b, and c indicate an oil flowing direction, an air flowing direction, and a mist conveying direction, respectively.

A mist feed tube 5 is formed of an air tube 7 and an oil tube 6 extending inside the air tube 7. Oil fed from an oil pump 4 and air fed from an air source 8 are formed into mists by the mist feed tube 5 and the mists are fed to an airtight container 2. Air from the air source 8 is fed to the airtight container 2 through an air hose 10 via an air flow-regulating valve 9.

Figure 1:
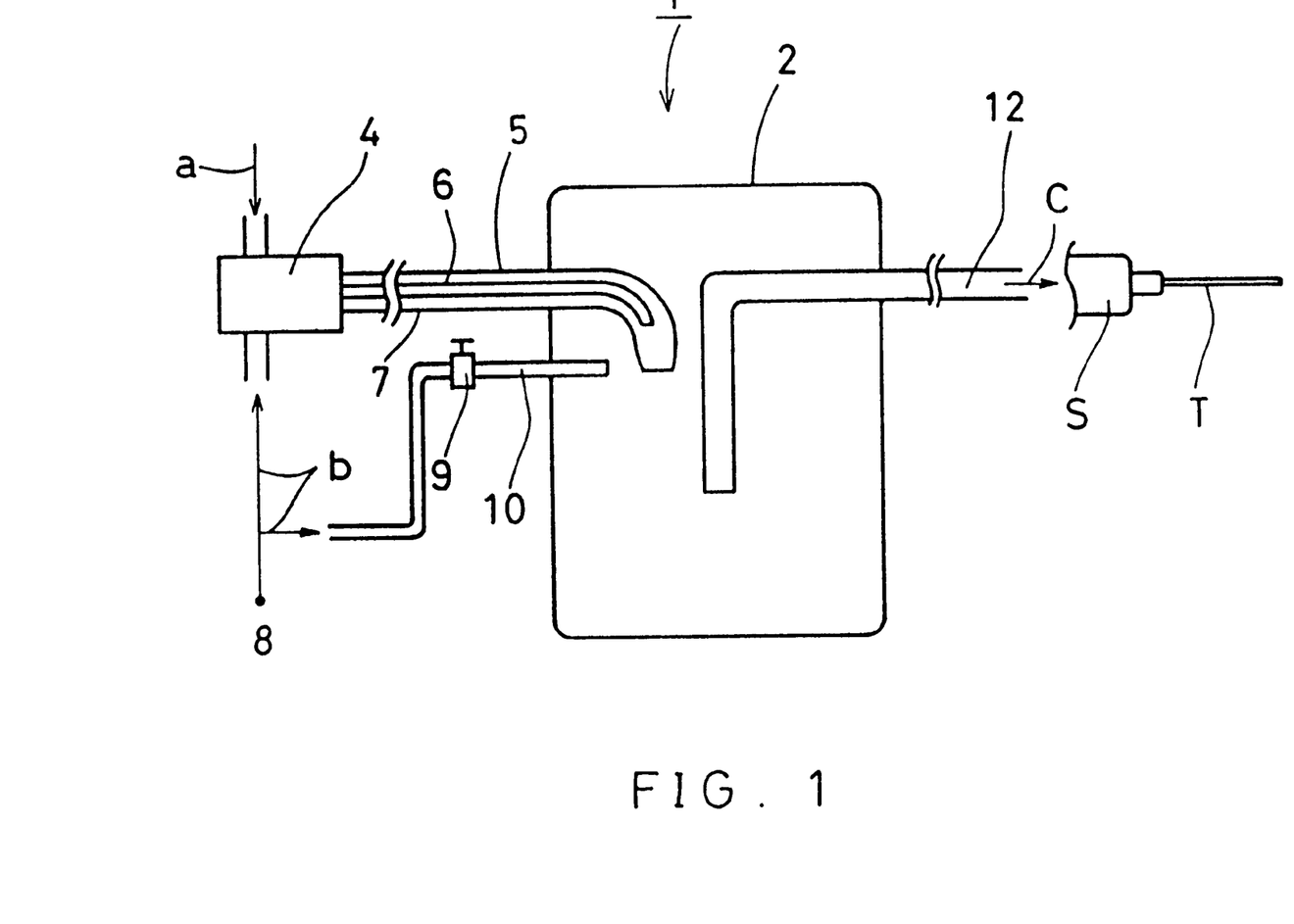

A mist-conveying pipe 12 is used for conveying mists in the airtight container 2 to the outside. For example, the mist-conveying pipe 12 can be attached to an oil supply part S of the machine tool as shown in this figure. In the oil supply part S, the mist particles are changed to large mist particles or oil droplets and they are directed toward a cutting edge T.

Figure 2:
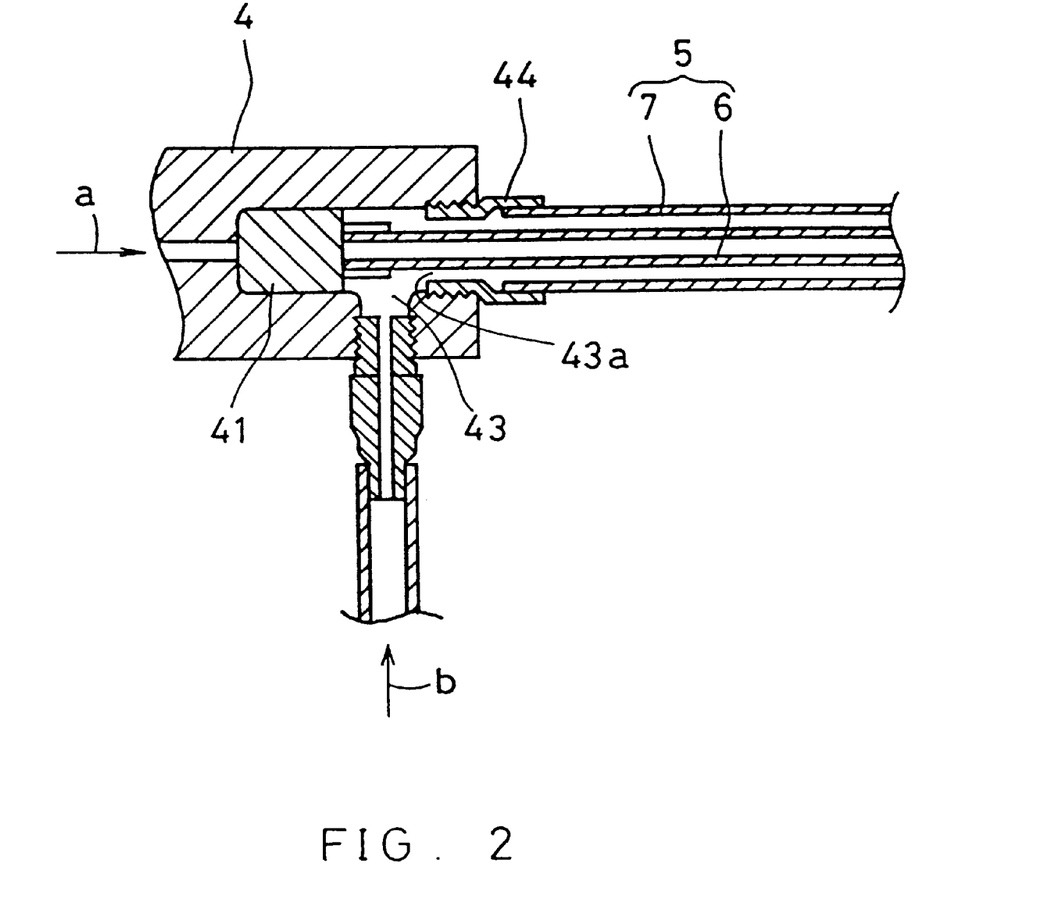

FIG. 2 shows the mist feed tube 5 and the oil pump 4 shown in FIG. 1 that are attached to each other. A pump part 41 of the oil pump 4 is provided for sucking up collected oil. One end of the oil tube 6 is connected to the pump part 41. One end of the air tube 7 is connected to the oil pump 4 by a mounting bracket 44. An air passage is inside the air tube 7 but outside the oil tube 6. This air passage is connected to an air passage 43 at an opening part 43a and the air passage 43 is connected with the air source 8.

The mist feed tube 5 has a double structure formed of the air tube 7 and the oil tube 6 extending inside the air tube 7.

Figure 3:
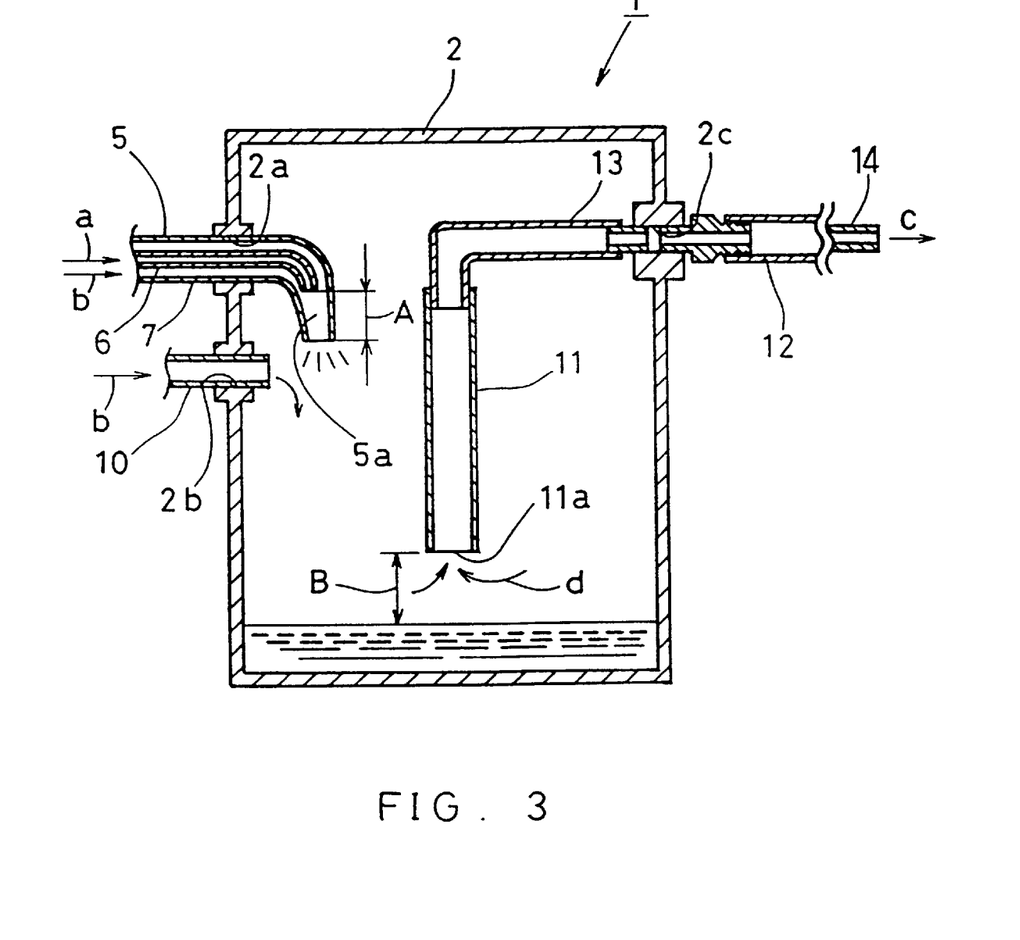

This example will be explained further in detail with reference to FIG. 3 as follows. FIG. 3 shows a cross-sectional view of a primary portion of a liquid coater according to Example 1. In an airtight container 2, an oil mist feed port 2a, an air feed port 2b, and an oil mist outlet 2c are formed. A mist feed tube 5 is provided at the oil mist feed port 2a. The mist feed tube 5 is connected to the oil pump 4 and is arranged so that the end of the mist feed tube 5 is located inside the airtight container 2.

In the end of the mist feed tube 5 inside the airtight container 2, the end of the oil tube 6 is located inward compared to the end of the air tube 7 by a length A. The length A is preferably about 20–40 mm. The space indicated by this length A forms a nozzle part 5a.

At the nozzle part 5a, oil that flows from the oil pump 4 through the oil tube 6 in the direction shown by an arrow a and is discharged from the end of the oil tube 6 and air flowing through the air tube 7 in the direction shown by an arrow b are mixed to form oil mists and the oil mists are fed into the airtight container 2.

An air hose 10 is provided to the air inlet 2b. One end of the air hose 10 is connected to the air source 8 (FIG. 1) via the air flow-regulating valve 9 (FIG. 1), and the other end is located inside the airtight container 2. The air hose 10 is provided with the air flow-regulating valve 9. Air flowing inside the air hose 10 in the direction shown by an arrow b is fed into the airtight container 2.

In the airtight container 2, a mist-conveying pipe 11 is oriented in the vertical direction. The mist intake 11a that is the lower end of the mist-conveying pipe 11 faces to the liquid surface of collected oil. The mist intake 11a is spaced from the liquid surface by a distance B.

A mist-conveying pipe 13 is connected to the upper end of the mist-conveying pipe 11. This mist-conveying pipe 13 is connected to a mist-conveying pipe 12 at the oil mist outlet 2c. The mist conveying pipe 12 is piped toward an outside oil supply part S.

It will be explained as follows how the coater operates while oil mists flow into the airtight container 2 from the nozzle part 5a and are spouted to the outside of the coater. The oil mist particles fed from the nozzle part 5a have various sizes from small to large. Not only a mist-state oil but also a drop-state oil is fed.

Mists and oil droplets drop from the nozzle part 5a due to gravity. Compared to the fall velocity due to gravity of large mist particles and oil droplets, the fall velocity due to gravity of fine oil mists is slow and the fine oil mists stay longer inside the airtight container 2. The fine oil mists are defined as smoke-like mists capable of drifting in the air.

The inside of the airtight container 2 is pressurized by an air pressure from the nozzle part 5a and an air pressure from the air hose 10. Therefore, the fine oil mists that do not reach to the bottom of the airtight container 2 and that are remaining in the airtight container 2 are susceptible to the pressurization and move in the direction shown by an arrow d. Then the fine oil mists flow through the mist intake 11a and are conveyed into the mist-conveying pipe 11.

Large oil mist particles and oil droplets drop to the bottom of the airtight container 2 quickly and are not susceptible to the air pressure. Therefore, these large oil mist particles and oil droplets do not easily flow into the mist-conveying pipe 11.

The oil mists flow through the mist-conveying pipe 11 and are conveyed to the mist-conveying pipe 13 and the mist-conveying pipe 12 sequentially. The oil mists conveyed through each conveying pipe are fine oil mists as mentioned above and therefore can be conveyed at a high speed and the oil mists do not adhere easily to the wall surfaces of the pipes. Consequently, the fine mists can go through the conveying pipes in a short time, even if there is a long distance to an object on which oil is supplied and the conveying pipes are long.

After going through the outside mist-conveying pipe 12, the oil mists pass through the discharge part whose diameter is narrowed down, thus increasing the velocity. Therefore, the particle size of the oil mists is enlarged, or the oil mists are changed to oil droplets depending on how narrow the diameter of the discharge part is set. As mentioned above, the particle size of the oil mists is changed or the oil mists are changed into oil droplets. The reason is that when the fine oil mists, i.e. the smoke-like oil mists that drift in the air are discharged without changing the particle size, most of the fine oil mist particles do not adhere to the object on which oil should be supplied.

FIG. 3 shows an example in which the oil mists after flowing through as mentioned above are spouted from a tool 14 having an outlet. The tool 14 is attached to, for example, a spindle (not shown in the figure) of a machining center connected to the mist-conveying pipe 12. Since oil mists having an enlarged particle size or oil droplets are spouted from the end of the tool 14, they adhere to workpieces easily. Consequently, the workpieces can be processed smoothly.

The oil mists flowing into the spindle from the mist-conveying pipe 12 have a fine particle size as mentioned above. Therefore, the oil mists are not susceptible to the centrifugal force caused by the spindle that rotates at a high speed, thus preventing the spindle from being blocked.

It is preferable that the pressure of the air flowing inside the air hose 10 is set to be the same as that of the air flowing inside the tube 5 for the oil mists.

When the height B of the intake 11a changes, the particle size of the oil mists that can be taken into the inside mist-conveying pipe 11 also changes. Therefore, by changing the inside mist-conveying pipe 11 to other pipes having various lengths, the height B of the intake 11a can be adjusted, thus regulating the particle size of the oil mists taken in.

At the bottom of the airtight container 2, oil that is collected in advance or that has dropped from the nozzle part 5a is collected. Depending on the amount of this collected oil, the flowing condition of the oil mists flowing out from the outside mist-conveying pipe 12 changes. Therefore, the particle size of the oil mists also can be regulated by increasing the amount of the oil fed from the outside or by changing the size of the airtight container 2.

Each mist-conveying pipe may be integrated to form one pipe. Similarly, in this case, the height B of the intake 11a can be changed by replacing the pipe.

The outside mist-conveying pipe 12 is not limited to one pipe. A plurality of pipes may be provided. In this case, the intermediate oil mist outflow pipe 13 should be branched into a plurality of pipes.

Figure 4:
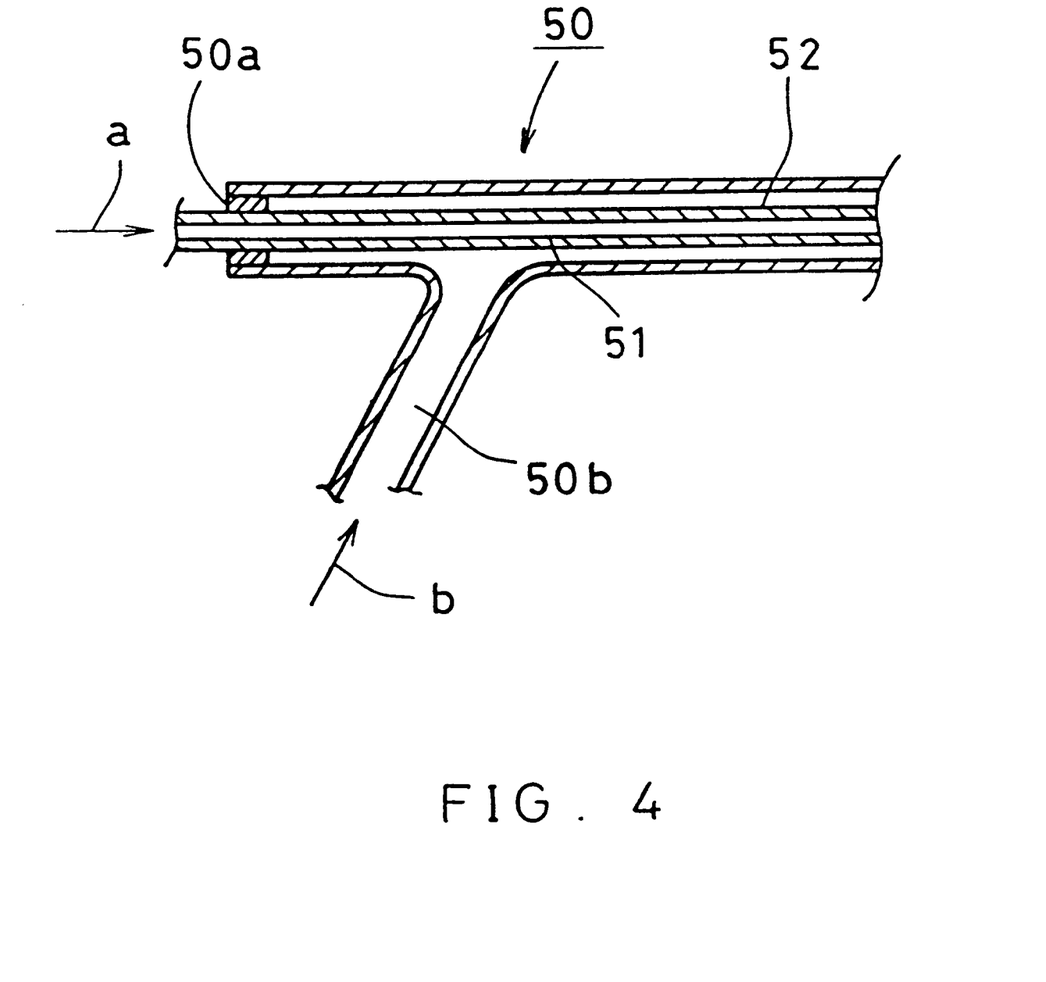

A mist feed tube 50 shown in FIG. 4 is different from an example shown in FIG. 2. An air tube 51 is forked and ports 50a and 50b are formed. An oil tube 52 is inserted into the air tube 51 from the port 50a. Thus, the mist feed tube 50 has a double wall structure. The oil tube 52 is connected to an oil pump. The port 50b is connected to an air source.

The oil feeder of the present example can be used in any machine tools when the oil feeder is connected to an oil tank in which oil is collected via an oil pump.

Example 2

Figure 5:
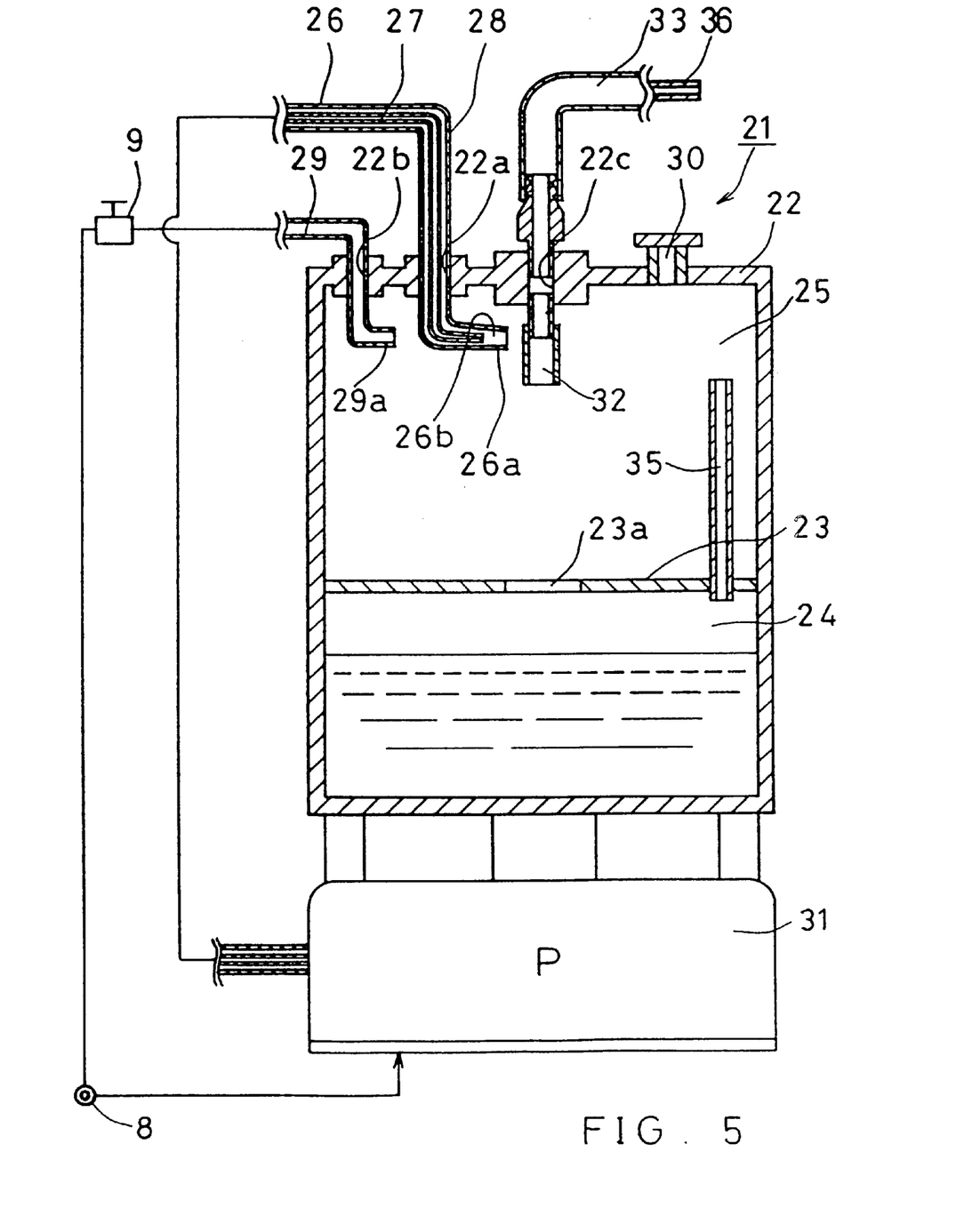

FIG. 5 shows a cross-sectional view of a primary portion of an oil feeder according to Example 2 of the present invention. An airtight container 22 has a body that is formed in a cylindrical shape. An oil pump 31 is connected to the bottom of the airtight container 22 by arranging pipes.

At an intermediate part of the airtight container 22, a partition 23 is arranged in the horizontal direction. The airtight container 22 is divided into an upper part and a lower part by the partition 23. In the part below the partition 23, an oil chamber 24 in which oil is collected is formed. In the part above the partition 23, an oil mist chamber 25 in which oil mists circulate is formed.

A mist feed port 22a, an air feed port 22b, and an oil feed port 30 are formed in the top panel of the oil mist chamber 25. In the oil mist inlet 22a, a mist feed tube 26 is arranged toward the oil mist chamber 25. In the air feed port 22b, an air hose 29 that is connected to an air source 8 directly via an air flow-regulating valve 9 is arranged.

Further, an oil mist outlet 22c is formed at the center of the top panel of the oil mist chamber 25. In the oil mist outlet 22c, an oil mist-conveying pipe 32 is directed toward the oil mist chamber 25 in the vertical direction, and a mist-conveying pipe 33 that supplies oil mists to an outside tool 36 is provided.

The mist feed tube 26 has a double structure in which an oil tube 27 is formed inside an air tube 28 like the mist feed tube 5 shown in FIG. 2. The tube 26 for oil mists is piped to the oil pump 31. The opening part of an outlet 26a is directed toward the inner-wall side face of the oil mist chamber 25. The position of the outlet 26a is set so that injected oil mists can circulate along the inner-wall side face.

It is preferable that the end of the oil tube 27 is located inward compared to the outlet 26a by about 20–40 mm. The space between the end of the oil tube 27 and the outlet 26a is a nozzle part 26b. At the nozzle part 26b, oil that flows out from the oil tube 27 and air that flows out from the air tube 28 are mixed to form oil mists. These oil mists are injected into the oil mist chamber 25 from the outlet 26a.

The oil pump 31 has the same shape and pipe arrangement as those in the oil pump 4 in Example 1. Oil collected inside the airtight container 22 is fed to the oil pump 31. Therefore, the air hose 29 also is piped to the oil pump 31. The opening part of the outlet 29a of the air hose 29 is directed toward the inner-wall side face of the oil mist chamber 25 as that of the outlet 26a. The position of the outlet 29a is set so that injected air can circulate along the inner-wall side face.

A flow-through hole 23a is formed at the center of the partition 23. Oil fed from an oil feed port 30 goes through the flow-through hole 23a and drops into the oil chamber 24. Further, since a pipe-like air passage 35 goes through a part of the partition 23, air can flow between the oil chamber 24 and the oil mist chamber 25.

The principle in which oil and air are fed from the oil pump 31 to form oil mists and then the oil mists flow into the airtight container 22 is the same as that in Example 1. Therefore, a detailed explanation is omitted. The oil pump 31 is connected to the bottom of the airtight container 22, and the airtight container 22 and the oil pump 31 are integrated. Therefore, the oil feeder 21 can be made small.

Most oil sucked up by the oil pump 31 is injected into the oil mist chamber 25 in a mist state from the outlet 26a of the tube 26 for oil mists. It will be explained as follows how the oil feeder operates while oil mists are fed into the oil mist chamber 25 and are discharged to the outside of the feeder. Oil mists injected from the outlet 26a circulate along the inner-wall side face of the oil mist chamber 25. Similarly, air injected from the outlet 29a of the air hose 29 also circulates along the inner-wall side face of the oil mist chamber 25.

The oil mists fed from the outlet 26a have various particle sizes from small to large. Not only a mist-state oil but also a drop-state oil is fed. Most of the large oil mist particles and oil droplets drop due to gravity. A part of the oil mists circulating along the inner-wall side face adheres to the inner-wall side face due to the influence of the centrifugal force caused by the circulation. According to the principle of the centrifugal force, the larger the particle size of oil mists is, the easier the oil mists adhere to the inner-wall side face.

The inside of the oil mist chamber 25 is pressurized by an air pressure from the nozzle part 26b and an air pressure from the air hose 29. Therefore, the oil mists circulating inside the oil mist chamber 25 are conveyed into the inside oil-mist-conveying pipe 32. As mentioned above, large oil mist particles and oil droplets drop due to gravity or adhere to the inner-wall side face due to the influence of the centrifugal force. Therefore, most of the oil mists conveyed into the inside oil-mist-conveying pipe 32 are smoke-like fine oil mists capable of drifting in the air.

As shown in FIG. 5, it is preferable that the inside oil-mist-conveying pipe 32 is arranged at the center of the airtight container 22. The reason is that large oil mist particles and oil droplets drop due to the gravity or adhere to the inner-wall side face due to the influence of the centrifugal force before reaching to the center of the oil mist chamber 25 and therefore are prevented from reaching to the center.

The operation after conveying oil mists into the oil mist-conveying pipe 32 is the same as in Example 1. FIG. 5 shows an example in which the circulated oil mists are spouted out from a tool 36 provided with a discharge opening. The tool 36 is attached to, for example, a spindle (not shown in the figure) of a machining center connected to the mist-conveying pipe 12. Oil mists having an enlarged particle size or oil droplets are spouted out from the tip of the tool 36. Therefore, the oil mists or the oil droplets adhere to workpieces easily, and thus the workpieces can be processed smoothly.

Generally, the oil pump 31 does not operate continuously, but operates intermittently. Oil mists and air injected into the oil mist chamber 25 tend to disturb the surface of oil at the bottom of the oil mist chamber 25. When the oil surface is disturbed, oil droplets are formed. The oil droplets flow into the mist-conveying pipe in some cases.

In the present example, the oil chamber 24 and the oil mist chamber 25 are divided by the partition 23. Therefore, oil mists circulate mainly in the oil mist chamber 25, thus preventing the oil in the oil chamber 24 from being disturbed. Thus, stable oil mists can be supplied even at the time of starting the oil pump.

Oil refueled from the oil feed port 30 passes the flow-through hole 23a in the partition 23 and is collected in the oil chamber 24. When the air pressure of the oil chamber 24 is applied to the flow-through hole 23a, the oil circulates slowly, thus delaying the oil feed accordingly. Such delay delays the start of the operation of the oil feeder 21.

Therefore, in the present example, the air passage 35 through which the oil chamber 24 and the oil mist chamber 25 communicate is provided. Consequently, the air in the airtight oil chamber 24 can be circulated into the oil mist chamber 25 and therefore oil can be fed without delay at the time of refueling oil, thus quickening the start of the oil feeder 21.

Example 3

Figure 6:
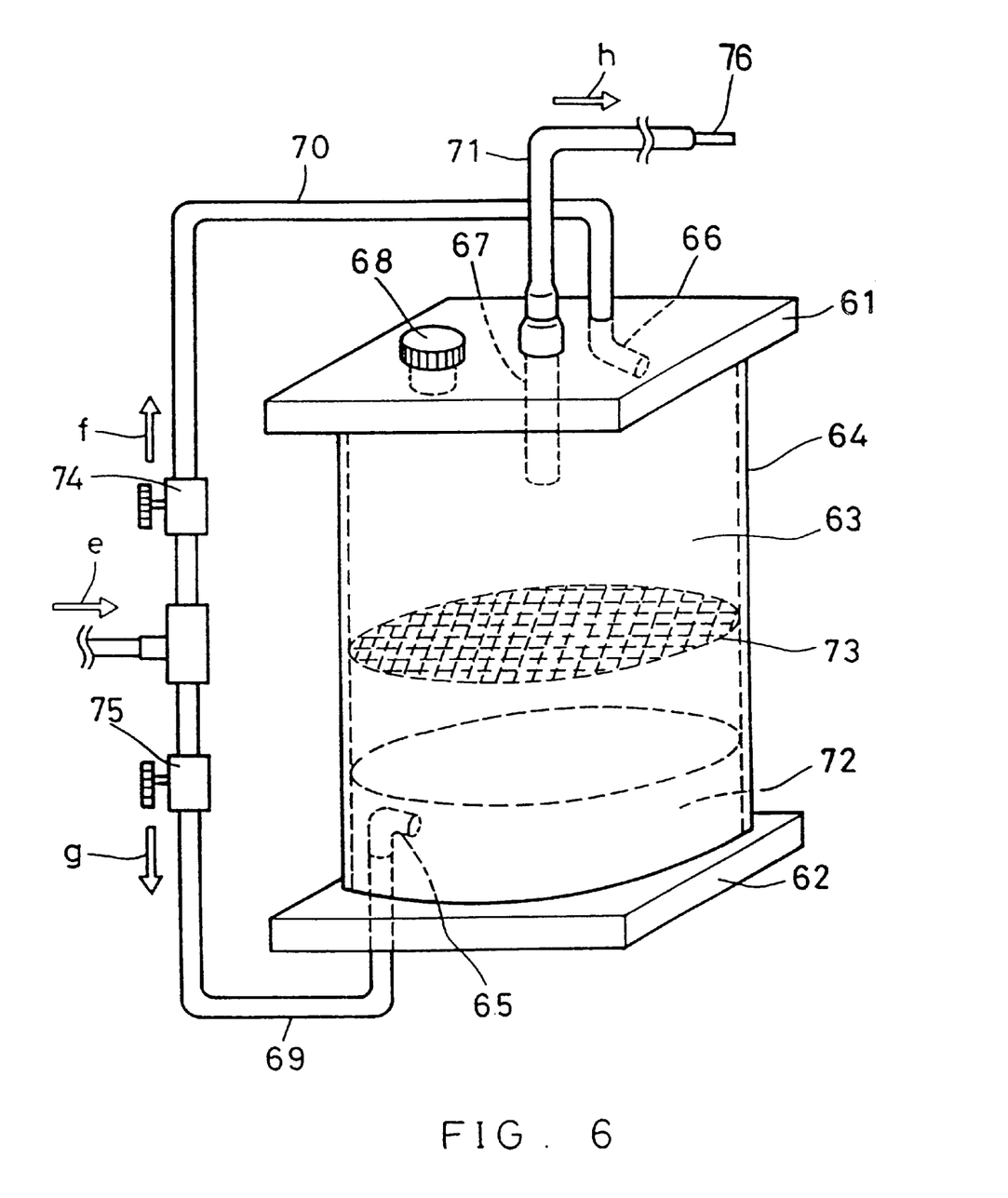

Example 3 of the present invention will be explained using the figures as follows. FIG. 6 shows a perspective view of an oil feeder according to the present example. A container 64 is formed of an upper flange 61, a lower flange 62, and a cylinder 63 located between the upper and the lower flanges. The upper flange 61 and the lower flange 62 are fixed reliably by thread fastening with a round-bar rod and the sealing between each flange and the cylinder 63 is ensured, which are omitted in the figure.

The lower flange 62 is provided with a lower nozzle 65. The upper flange 61 is provided with an upper nozzle 66, a mist-conveying pipe 67, and a liquid injection port cap 68. Tubes 69, 70, and 71 are connected to the lower nozzle 65, the upper nozzle 66, and the mist-conveying pipe 67, respectively. A certain amount of oil 72 is filled into the container 64. The lower nozzle 65 is immersed in the oil 72. The container 64 is provided with a filter 73. By fitting the peripheral part of the filter 73 and the inner-wall side face of the container 64, the container 64 is divided into an upper part and a lower part by the filter 73.

The lower nozzle 65 injects gas that has passed inside the tube 69 in the direction shown by arrows e and g from a gas source (not shown in the figure). Generally, air is used as the gas. The upper nozzle 66 injects gas that has passed inside the tube 70 in the direction shown by arrows e and f. The amount of gas injected from each nozzle can be controlled by regulating gas flow-regulating valves 74 and 75.

Figure 7:
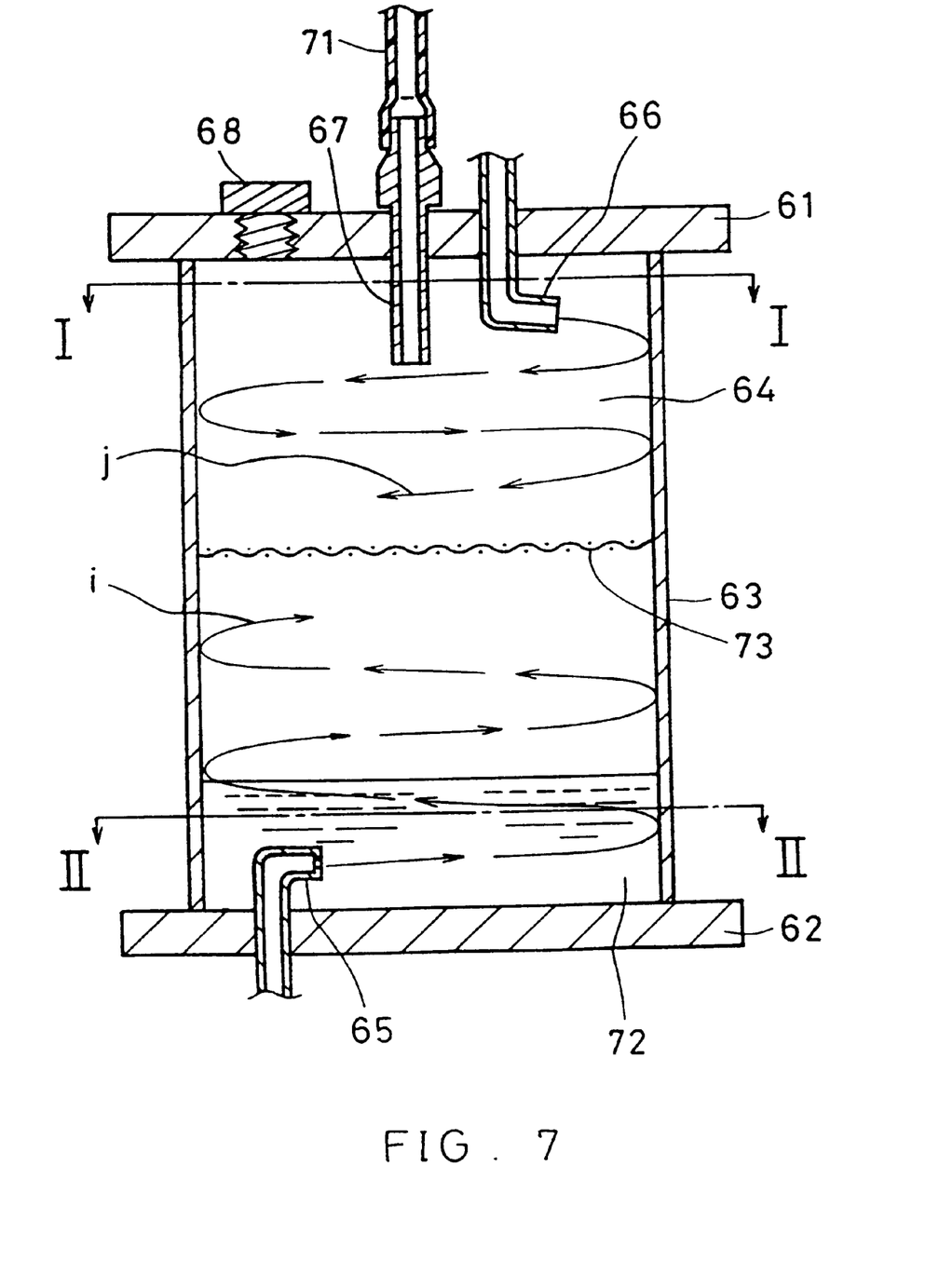
Figure 8A:
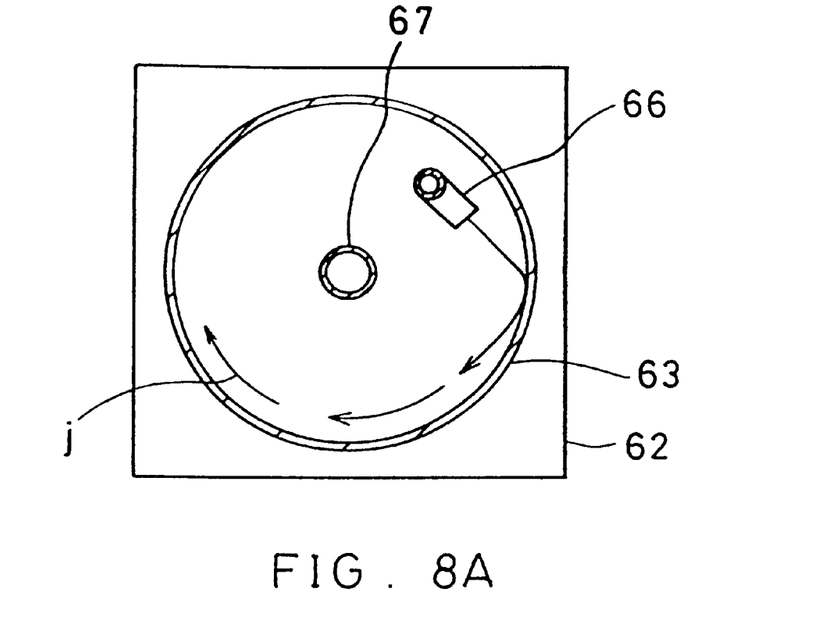
Figure 8B:
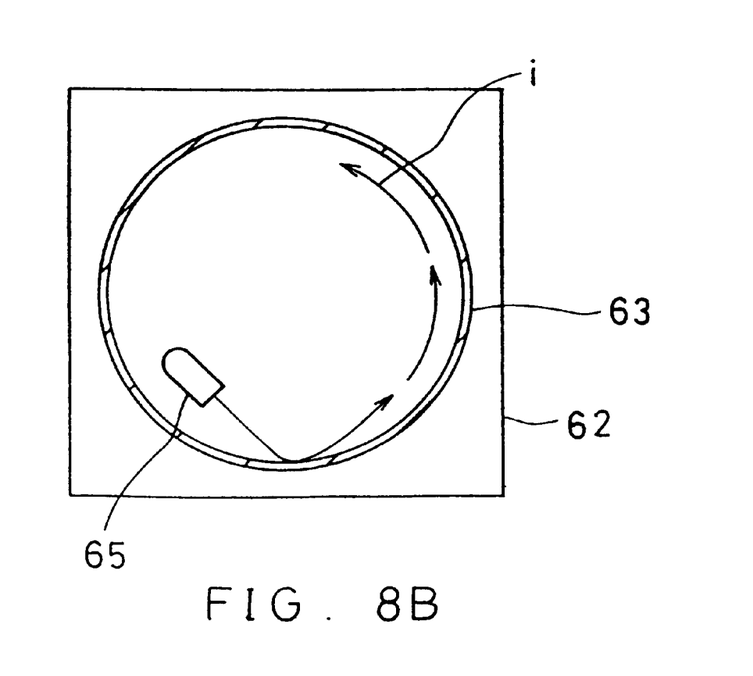

The operation of this embodiment will be explained in detail using FIGS. 7 and 8. FIG. 7 shows a cross-sectional view of the liquid coater shown in FIG. 6 in the vertical direction. When injecting gas into the oil 72 from the lower nozzle 65, the oil 72 is splashed and entrained by this injected gas and is atomized and diffused from the liquid surface. Thus, the oil 72 is changed to mists. An internal pressure is applied inside the container 64 by the gas injected from the lower nozzle 65. Therefore, the generated mists are eventually conveyed to the outside of the container through the mist-conveying pipe 67 and the tube 71.

The flow of the injected gas and the mists will be explained using FIG. 8B. FIG. 8B is a cross-sectional view taken on line II—II in FIG. 7. The gas injection port of the lower nozzle 65 is provided at an off-center position in the horizontal direction of the container 64. Further, the end of the gas injection port of the lower nozzle 65 faces to the inner-wall side face so that the injected gas circulates along the inner-wall side face after colliding with the inner-wall side face. That is to say, the gas injected from the lower nozzle 65 collides with the inner-wall side face of the container 64 and then rises while circulating along the inner-wall side face in the rotation direction shown by an arrow i.

At the part above the liquid surface in the container 64, the injected gas continues to rise together with generated mists while circulating along the inner-wall side face in the rotation direction shown by an arrow i as shown in FIG. 7.

The particle sizes of the generated mists vary. Oil droplets also are atomized and diffused from the liquid surface. Most of the mists and a part of the oil droplets rise while circulating as mentioned above. However, the filter 73 prevents mists having a larger particle size than a certain size and oil droplets from rising. As the filter 73, for example, a filter formed of metal wires in a braided form is used. It is preferable that the filter 73 has a smaller mesh size in order to separate mists having a large particle size. However, when the mesh size is too small, conversely, essentially necessary mists also are separated. Therefore, it is necessary to secure a larger mesh size than a certain size.

Thus, large mist particles and oil droplets can not be separated completely, and a part of them further rises to the upper side of the filter 73. According to the result of a test conducted with gas injected from the upper nozzle 66 stopped, most of the large mist particles and the oil droplets rise in an oil-drop state adhering to the inner-wall side face or rise while circulating in the vicinity of the inner-wall side face. Therefore, when providing the mist-conveying pipe 67 almost at the center in the horizontal direction of the container 64 as shown in FIG. 7, the large mist particles and the oil droplets can be prevented from flowing into the mist-conveying pipe 67.

In order further to reduce the large mist particles and the droplets flowing into the mist-conveying pipe 67, the upper nozzle 66 is provided. The movement of the gas injected from the upper nozzle 66 will be explained using FIG. 8A as follows. FIG. 8A is a cross-sectional view taken on line I—I in FIG. 7 (the filter 73 is omitted in the figure).

The gas injection port of the upper nozzle 66 is provided at an off-center position in the container 64. Further, the end of the gas injection port of the upper nozzle 66 faces to the inner-wall side face so that injected gas circulates along the inner-wall side face after colliding with the inner-wall side face.

The upper nozzle 66 is inclined slightly downward with respect to the horizontal direction (FIG. 7). By setting the position and angle of the upper nozzle 66 in such a manner, the flow of gas injected from the upper nozzle 66 collides with the inner-wall side face of the container 64 and then descends while circulating along the inner-wall side face in the rotation direction shown by an arrow j (in the opposite direction to the rotation direction shown by the arrow i) (FIG. 7).

The circulating flow of the gas injected from the lower nozzle 65 in the rotation direction shown by the arrow i and the circulating flow from the upper nozzle 66 in the direction shown by the arrow j that is opposite to the direction shown by the arrow i flow together inside the container 64. When referring to the inner-wall side face as an example, large mist particles and oil droplets adhering to the inner-wall side face that tend to rise are pushed back along the inner-wall side face or rise slowly due to the circulating flow of the gas injected from the upper nozzle 66 that tends to descend in the rotation direction shown by the arrow j. Thus, the large mist particles and the oil droplets on the inner-wall side face or in the vicinity of the inner-wall side face can be prevented from flowing into the mist-conveying pipe 67.

According to the set value of the injecting amount of each nozzle, the circulation caused by the gas injected from the lower nozzle 65 is partially cancelled or is slowed by the gas injected from the upper nozzle 66. Thus, the disturbance at the liquid surface by the lower nozzle 65 can be prevented and therefore the generation of large mist particles and oil droplets can be decreased.

Due to the gas injected from both the upper and the lower nozzles, the circulation momentum itself is weakened. However, since gas is injected from both the upper and the lower nozzles, the internal pressure in the container 64 increases compared to the case where gas is injected only from the lower nozzle 65. Therefore, the rising momentum of mists increases conversely, and the mists in the container 64 flow into the mist-conveying pipe 67 with stronger momentum.

In other words, due to the gas injected from the upper nozzle 66, not only large mist particles and oil droplets are prevented from flowing into the mist-conveying pipe, but also the conveying speed can be accelerated.

When only increasing the amount of gas injected from the lower nozzle 65, the disturbance at the liquid surface becomes too big. Therefore, it is necessary to restrain the amount of gas injected from the lower nozzle 65 to a certain amount or less. However, the mist discharging velocity can be increased beyond the limitation of the lower nozzle 65 by injecting gas from the upper nozzle 66. Thus, the mist conveying speed can be regulated in a wide range.

In this case, large mist particles and oil droplets included in mists generated tend to gather on the inner-wall side face or in the vicinity of the inner-wall side face, and fine mists tend to gather at the center as mentioned above. The large mist particles and the oil droplets on the inner-wall side face or in the vicinity of the inner-wall side face are prevented from rising by gas injected from the upper nozzle 66. Therefore, when the mist-conveying pipe 67 is provided at the center in the horizontal direction of the container 64, the large mist particles and the oil droplets can be prevented from flowing into the mist-conveying pipe.

In the present example, air is injected from the lower nozzle 65 and mists are generated directly from the oil present at the bottom of the container. Therefore, it is not necessary to circulate the oil. As a result, an oil circulating pump, pipes necessary for the pump, and the like are not required, thus simplifying the coater itself.

When continuing the operation of this coater and discharging mists through the mist-conveying pipe 67, the oil is consumed and the liquid level goes down. However, oil can be replenished by removing the liquid injection port cap 68.

The flow of oil mists after being conveyed into the mist-conveying pipe 67 is the same as in Examples 1 and 2. The oil mists are conveyed to the mist-conveying pipe 71 through the mist-conveying pipe 67.

The oil mists after passing through the mist-conveying pipe 71 pass through the discharge part 76 whose diameter is narrowed down with respect to the mist-conveying pipe 71. Oil mists having a enlarged particle size or oil droplets are discharged from the discharge part 76. Therefore, the oil mists or the oil droplets adhere to workpieces easily and thus the workpieces can be processed smoothly.

In the present embodiment, oil is filled in the container 64. However, even if filling another liquid, for example, water, mists can be generated.

In the present embodiment, the upper nozzle 66 and the mist-conveying pipe 67 are provided in the top panel. However, it is not always necessary to provide them in the top panel as long as they are provided in the upper part of the container.

In the present embodiment, the lower nozzle 65 is provided in the bottom of the container 64. However, the lower nozzle 65 may be provided so as to extend from the upper part of the container as long as the gas injection port of the lower nozzle 65 is in the liquid.

In the present embodiment, one lower nozzle 65 is provided. However, a plurality of lower nozzles may be provided.

In the present embodiment, the filter 73 is used inside the container 64. However, the container 64 can be used without a filter when the container 64 has a certain height or more. This is because large mist particles and oil droplets drop due to the gravity before reaching the mist-conveying pipe 67.

It is possible to regulate the mist amount, the mist particle size, and the mist conveying speed by controlling the amount of injected gas by gas flow-regulating valves 74 and 75.

Explanation will be made using a more detailed example as follows. In this example, a container had a cylindrical shape, an outer diameter of 120 mm, an inner diameter of 100 mm, and a height of 350 mm. The amount of oil to be filled in the container 64 was an amount for filling the container 64 so that the oil level is at a position of 30 mm from the bottom of the container 64. In this case, the lower nozzle 65 was immersed in the oil. A cutting oil was used as the oil.

The diameter of each gas injection port of the lower nozzle 65 and the upper nozzle 66 was set to 1.7 mm. The inner diameter of the end of the mist-conveying pipe 67 inside the container 64 was set to about 11.5 mm (JIS gas pipe ¼"). The port of the lower nozzle 65 was set so as to be located at an off-center position shifted from the center of the bottom of the container 64 by 35 mm. The port of the upper nozzle 66 was set so as to be located at an off-center position shifted from the center of the top panel of the container 64 by 35 mm. The direction of the port of each nozzle was set so that the circulation directions of the gas discharged from the nozzles were opposite to each other.

The end of the tube 71 (a total length of 3 m) for the mist-conveying pipe 67 was attached to a spindle of a machining center. A tool having two oil discharge openings was attached to the tip of this spindle. The diameter of each oil discharge opening was set to 1.0 mm. The filter 73 was provided inside the container 64 and its mesh size was 150 μm.

The upstream air feed pressure was set to 5.5 kgf/cm². The discharge flow-volume of the lower nozzle 65 was set to 78NL/min and the discharge flow-volume of the upper nozzle 66 was set to 22NL/min. In this case, the pressure inside the container was 4.3 kgf/cm².

Using a liquid coater that was set as mentioned above, generated mists were changed to oil droplets and were discharged from the oil discharge openings locating at the tip of the tool attached to the spindle. In this case, when the particle diameters of the mists are relatively small and almost uniform, the mists are not susceptible to the centrifugal force caused by the rotation of the spindle. Consequently, most of the mists do not remain in the spindle and are discharged.

However, when mists having a large particle size that is a certain particle size or more or oil droplets are mixed in the mists, they adhere to the inner wall of the spindle by the centrifugal force caused by the rotation of the spindle. As a result, the mists remain inside the spindle and can not be discharged sufficiently.

In this example, even when changing the rotating speed of the spindle within the range of 0–6000 rpm, mists do not remain inside the spindle. The mists can be discharged after being changed to oil droplets within about 1 second from the operation start of the coater. The discharging condition was good. Therefore, according to the present example, it can be conceivable that the mists that have flown into the mist-conveying pipe 67 have a relatively small particle size and are almost uniform.

INDUSTRIAL APPLICABILITY

As mentioned above, the liquid coater of the present invention can generate fine mists with a simple configuration by simplifying the structure of the mist generating part and can convey the mists at a high speed by providing a gas feed passage. Therefore, the liquid coater is excellent in fast-response. Thus, the liquid coater can be utilized as an oil feeder for feeding a cutting oil to a cutting edge of a machine tool such as a machining center, a grinding machine, or a lathe.

What is claimed is:

1. A cutting liquid coater, comprising:

a mist feed outlet for feeding mists into a container;

a gas feed outlet for feeding gas into the container, which is provided separately from the mist feed outlet;

a gas feed passage for feeding gas into the gas feed outlet, the gas feed passage being provided with an adjusting device for accelerating the mists and regulating a conveying speed at which the mists are conveyed; and a mist conveying passage for conveying mists at the conveying speed that has been regulated by the gas inside the container to the outside of the container; wherein liquid for generating mists is collected in the container, the liquid flows into a liquid pump connected to the container, and the liquid discharged from the liquid pump goes through the mist feed outlet and is fed as mists into the container; and the end of the mist feed outlet is arranged so that mists are injected from the mist feed outlet toward an immer wall side face of the container so that mists can circulate along the inner wall side face of the container.

2. The cutting liquid coater according to claim 1, wherein a discharge part with a narrowed tip is connected to an end of the mist conveying passage.

3. The cutting liquid coater according to claim 1, wherein the mist feed outlet has a double tube structure comprising a gas tube in which gas flows and a liquid tube in which liquid flows that extends inside the gas tube, and an end of the liquid tube is positioned inward compared to an end of the gas tube.

4. The cutting liquid coater according to claim 3, wherein mists are generated at a space between the end of the liquid tube and the end of the gas tube by mixing a liquid discharged from the liquid tube and a gas flowing inside the gas tube.

5. The cutting liquid coater according to claim 1, wherein a gas flow-regulating valve is connected to the gas feed passage.

6. The cutting liquid coater according to claim 1, wherein the liquid pump is integrated with the container at the bottom of the container.

7. The cutting liquid coater according to claim 1, wherein the container is formed in a cylindrical shape.

8. The cutting liquid coater according to claim 1, wherein the end of the mist conveying passage inside the container is provided almost at the center in the horizontal direction of the container.

9. The cutting liquid coater according to claim 1, wherein a partition in which a flow-through hole is formed is provided in the horizontal direction of the container, the container is divided into an upper part and a lower part by the partition, a liquid reservoir is provided below the partition, and the mist feed outlet, the gas feed outlet, and the mist conveying passage are provided above the partition.

10. The cutting liquid coater according to claim 9, wherein a pipe is provided at a part of the partition in the vertical direction and the pipe enables gas in the upper part and the lower part to be circulated.

* * * * *